United States Patent [19]
Brichard

[11] 3,798,015
[45] Mar. 19, 1974

[54] GLASS SHEET DRAWING METHOD AND APPARATUS

[75] Inventor: Claude Brichard, Moustier-sur-Sambre, Belgium

[73] Assignee: Glaverbel S.A., Watermael-Boitsfort, Belgium

[22] Filed: July 14, 1972

[21] Appl. No.: 271,754

[30] Foreign Application Priority Data
Aug. 20, 1971 Luxembourg.......................... 63755

[52] U.S. Cl............................ 65/95, 65/194, 65/204
[51] Int. Cl............................................. C03b 15/04
[58] Field of Search......... 65/95, 96, 193, 194, 196, 65/197, 198, 203, 204

[56] References Cited
UNITED STATES PATENTS

| | | | |
|---|---|---|---|
| 2,928,213 | 3/1960 | Crandon, Jr. | 65/194 |
| 2,849,837 | 9/1958 | Thum et al. | 65/203 |
| 3,206,293 | 9/1965 | Atkeson | 65/204 X |
| 3,232,733 | 2/1966 | Ward | 65/193 |

FOREIGN PATENTS OR APPLICATIONS
863,251  2/1971  Canada................................ 65/203

Primary Examiner—Arthur D. Kellogg
Attorney, Agent, or Firm—Spencer & Kaye

[57] ABSTRACT

A method and apparatus for improving the quality of glass produced by drawing a ribbon of glass from a molten glass bath through a drawing chamber, by producing a flow of gas in the chamber and around the ribbon so as to cause the gas to repeatedly traverse at least one closed circuit extending through a region opposite at least one of the two outer thirds of the ribbon width.

42 Claims, 9 Drawing Figures

GLASS SHEET DRAWING METHOD AND APPARATUS

BACKGROUND OF THE INVENTION

The present invention relates to a process of manufacturing sheet glass by supplying molten glass to a drawing zone and drawing glass from the molten surface at that zone as a continuous ribbon which is guided through zones in which the glass sets and cools. The invention also relates to apparatus for use in manufacturing sheet glass by this process.

There are various known processes for manufacturing sheet glass by drawing a ribbon of molten glass from a drawing zone to which molten glass is supplied. In some of these processes the ribbon is drawn from the surface of a quantity of molten glass flowing to the drawing zone. An example of such a process is the classic Pittsburgh process in which the molten glass which flows into the ribbon is derived from the upper levels of a bath of molten glass. Another example of such a process is the classic Libbey-Owens or Colburn process in which molten glass flows into the ribbon from the full depth of a relatively shallow bath.

Surface-drawing processes are not confined to the classic ones which have been specifically mentioned. For example, it is known to draw the ribbon from a supply of molten glass which is fed to the drawing zone while floating on a bath or layer of molten material, e.g., a molten metal, of higher specific gravity, acting as a lubricant between the molten glass and the sole of a refractory kiln in which the molten materials are held.

As another example of a special type of surface-drawing process, the ribbon of glass, instead of being drawn via a meniscus formed at a free fluid surface of the supply of molten glass, may be drawn from a meniscus which is cooled to prevent flow of molten glass beyond the location of the meniscus as, e.g., is described in United Kingdom Pat. Specification No. 988,128.

Such surface-drawing processes are quite distinct from glass drawing processes in which the ribbon of molten glass is extruded from beneath the surface of the supply of molten glass. The most notable extrusion type process is the classic Fourcault process in which the molten glass is extruded upwardly through a slot in a so-called debiteuse which is partly immersed in the quantity of molten glass which flows to the drawing zone. In extrusion type processes the thermal and rheological conditions are very different from those which prevail in surface-drawing processes and the present invention is not concerned with such extrusion-type processes.

In all of the known processes of drawing a ribbon of glass from the surface of a supply of molten glass, the ribbon of glass is drawn from the drawing zone through a drawing chamber in which the ribbon becomes dimensionally set and the ribbon is led on through a shaft, or lehr, in which the ribbon progressively cools preparatory to being cut into sections. The shaft, which is known as an annealing shaft, can be a vertical shaft surmounting the drawing chamber, as for example in the classic Pittsburgh process. Alternatively, the shaft can be a horizontal shaft into which the ribbon passes after being bent about a bending roll. A horizontal shaft is used in the classic Libbey-Owens process. Of course, the classic processes are subject to many variations and a given process can embody features derived from classis processes of different types. To take one example, a horizontal shaft is used in certain processes in which the ribbon is drawn from a bath of molten glass of appreciable depth as in the classic Pittsburgh process but is bent about a bending roll as in a classic Libbey-Owens process.

All of the known surface drawing processes produce sheet glass which is more or less imperfect in the sense that the faces of the sheet glass are not truly flat and parallel at all locations. Due to the lack of true flatness and parallelism of the sheet faces, the sheet glass causes angular deflections of light waves travelling through the glass so that objects viewed through the glass under certain conditions appear distorted.

The defects in the drawn sheet glass include defects of various kinds in the surface of the glass.

One kind of surface defect consists of waves running more or less parallel to the line of draw of the glass. These defects are quite apparent when viewing objects at a shallow angle through the sheet glass in a plane normal to the line of draw, particularly during change in the viewing angle.

Another kind of defect is known as "martelage" or "hammering". This kind of defect takes the form of a haphazard distribution of shallow surface depressions usually measuring from 1 to 4 cm across. These defects, although normally less apparent than waves, are nevertheless also apparent to ordinary observation due to their distorting effect on objects viewed through the glass at shallow angles to the sheet.

Yet another kind of defect appears as intersecting series of diagonal and vertical lines, predominantly in outer portions of the ribbon width, with the diagonal lines running upwardly away from the side margins towards the central region of the ribbon.

The foregoing are the main but not the only kinds of surface defects which are encountered in sheet glass.

In some cases, drawn sheet glass also exhibits surface defects known as "transparent or green patch" which are linear defects in the planeity of the surface, the defects being continuous and substantially parallel with the line of draw of the glass, and involving a local modification of the thickness of the sheet such as to distort objects viewed by transmitted or reflected light. The dimension of this type of defect, measured in a direction normal to the line of draw, is generally in the range from 10 cm to 20 cm.

The surface defects which have been described, and other surface defects, are known to be due to the fact that the glass ribbon is exposed to the influence of environmental gas currents which exert on the ribbon a cooling action which is irregular in both time and space. These currents are due to various causes. Due to the interconnection of the drawing chamber and the annealing shaft, the shaft creates a chimney effect which causes such natural draft currents to be propagated through the drawing chamber and the annealing shaft. Hot gas currents flow upwardly along the central region of the ribbon from the intensely hot drawing zone, through the drawing chamber and into the annealing shaft. In counter-current therewith, cooler currents of gases flow back into the drawing chamber from the annealing shaft along the walls of the apparatus. The chimney effect is very marked when the annealing shaft is vertical. The chimney effect is, however, also a very important factor in the classic Libbey-Owens or Colburn process and in other processes using a horizontal annealing shaft.

The rising currents of hot gas caused by the above-described chimney effect tend to give rise to turbulence in the upper part of the drawing chamber, whereas some of the cooler gas flowing back into the drawing chamber tends to flow down within the chamber along the walls thereof and then, as it becomes heated, to flow inwardly along generally upwardly inclined paths to join the main upward convection current of gas along the central longitudinal portion of the ribbon path. In the course of such flow, some of this cooler gas sweeps across the outer portions of the width of the ribbon path and this also gives rise to adverse conditions.

Another cause of thermal heterogeneities in the environmental conditions is the leakage of currents of ambient air into the drawing chamber through cracks in the refractory walls or via imperfectly sealed joints between such walls and mechanical components which extend through such walls into the drawing chamber and which are required for the performance or control of the drawing process. Examples of such components are the supports for the edge rolls normally provided for gripping the ribbon of glass a short distance above the drawing zone, and conduits leading to the cooler or coolers located within the drawing chamber.

Yet another cause of troublesome environmental gas currents is the cooler or coolers usually provided in the drawing chamber. It is usual for a cooler to be located on one or each side of the glass ribbon, at a level quite close to its origin, in order to accelerate the cooling of the ribbon as it is drawn from the supply of molten glass. The gases cooled by such coolers tend to descend onto the molten glass at the drawing zone and to influence the distribution of heat in the main upward currents caused by the above-described chimney effect. It is difficult to eliminate in such descending gases, temperature differences from one region to another across the ribbon width. Any irregularities in the cooling action of these gases is of course liable to have seriously adverse effects on the drawn glass ribbon because they play upon its surface where the glass is at very low viscosity.

In some processes one or more additional coolers are provided at a higher level in the drawing chamber. Any such additional higher level cooler further increases the rate of cooling of the glass ribbon, but the influence of such a cooler on the pattern of convection currents set up in the drawing chamber is quite different from that of a cooler located near the ribbon source. Thermally heterogeneous gas currents at such higher level have their own peculiar effect on the ribbon due to the characteristic flow pattern and velocities of such currents and on the condition of the ribbon surfaces at that higher region of the drawing chamber.

The desire to approach further towards the ideal of producing surface-drawn sheet glass which is quite free from optical defects has stimulated much research in the sheet glass manufacturing industry into ways of creating more favorable heat distribution in the environment through which the ribbon is drawn and cooled. As a result, various corrective measures have been proposed which are intended to establish a predictable and more favorable temperature profile across the glass ribbon path through the drawing chamber. In general terms, what is involved in these measures is the supply of heat to predetermined zones within the drawing chamber and/or the exertion of forces in the drawing chamber in order to modify the normal distribution of convection currents.

In practice some of these hitherto proposed corrective measures have been found to be capable of improving the optical qualities of the sheet glass by avoiding or reducing the occurrence of certain surface defects, notably waves and hammering. Waves are known to be caused by the effect of the cool air falling from the cooler or coolers located near the origin of the ribbon, while hammering is mainly caused by the effect of the additional cooler or coolers located at a higher level in the drawing chamber as mentioned above.

However, even when the known corrective measures are taken to establish a more favorable heat distribution in the atmosphere across the ribbon path through the drawing chamber, the drawn sheet glass often still exhibits certain kinds of fine surface defects which give rise to optical distortion and make the sheet glass unsuitable for use in situations which call for sheet glass of high optical quality.

One of the particularly persistent and troublesome types of surface defect which has proved impossible to eliminate by taking the known corrective measures is the type previously described as composed of an intersecting series of diagonal and vertical lines.

SUMMARY OF THE INVENTION

It is an object of the present invention to influence the environmental conditions in the drawing chamber to prevent or reduce the occurrence of surface defects of this type, and thus to make possible a further improvement in the achievable quality of drawn sheet glass.

The objects according to the present invention are achieved by a process of manufacturing sheet glass by supplying molten glass to a drawing zone, drawing glass as a continuous ribbon from the surface of the supply of molten glass at that zone, through a drawing chamber and a contiguous annealing shaft, and exerting gas-displacing forces in the drawing chamber, in directions across the ribbon path, at positions such as to cause gases surrounding the ribbon repeatedly to traverse, within the drawing chamber and on at least one side of the ribbon, at least one closed circuit which extends through a region opposite at least one of the two outer thirds of the ribbon width.

It has been found that when such a circulation of gases on one or each side of the ribbon is brought about in the atmosphere in the drawing chamber, the occurrence of the above-described defects which appear as intersecting series of diagonal and vertical lines in the outer portions of the ribbon width is avoided or, if some defects of that kind do occur, are very much less severe than they are in the absence of such circulation of gases.

The occurrence of such intersecting line defects is now thought to be attributable wholly or mainly to the inward and upward movement, across the marginal portions of the ribbon, of gases which have previously descended along the walls of the drawing chamber and become reheated so that they rise to join the main upward convection current. Probably such defects are in many cases also to some extent contributed to by the effect of the relatively cold currents of air which leak into the drawing chamber from the surrounding atmosphere via cracks or imperfectly sealed joints as previously mentioned. Due to the very high temperatures within the drawing chamber and the strong natural draft currents it is in practice extremely difficult to prevent such leakages from occurring. Whatever be the cause of the intersecting line defects, it has been found that they can be avoided or reduced by bringing about circulation of gases within the environment of the ribbon of glass in the drawing chamber in the manner taught by the invention.

It has been found that in some cases the circulation of gases in accordance with the invention results, as a secondary effect, in the avoidance or reduction of the surface defects previously referred to and called "transparent" or "green patch". Moreover, in certain test processes embodying the invention the circulation of gases was found to result in an improvement in the thickness profile of the glass ribbon at its outer margins such as to reduce the width of the marginal portions which had to be cut away and discarded as of unacceptable quality.

As has already been stated, it is usual in the drawing of sheet glass for the ribbon of glass to be drawn past at least one cooler, called a main cooler, located in the lower portion of the drawing chamber and serving to accelerate the dimensional setting of the ribbon. The present invention includes, as important embodiments thereof, processes in which such a main cooler or coolers are used and in which at least one circulation of gas is brought about by at least one gas-displacing force exerted in a direction across the ribbon path and at the general level of a main cooler. The principal advantage of this feature is that the circulatory motion of the gases in some way favorably influences the heat distribution in the environment in the vicinity of the main cooler and can therefore also contribute to keeping the sheet glass free from serious wave defects.

The invention also includes processes in which the ribbon is drawn past at least one main cooler and past at least one additional cooler, called a secondary cooler, located at a higher level in the drawing chamber and in which at least one circulation of gas is brought about by at least one gas-displacing force which is exerted in a direction across the ribbon path and at the general level of a secondary cooler. Such processes are advantageous because the circulation of gases due to or with the assistance of forces exerted at such a level contributes to the prevention of hammering.

In certain advantageous processes according to the invention, a circulation of gases within the drawing chamber is brought about by exerting at least one gas-displacing force in a direction across the ribbon path and at the general level of a main cooler and at least one gas-displacing force in the reverse direction across the ribbon path and at the general level of a secondary cooler. The circulation of gases by forces exerted at such locations has, as a secondary effect, a tendency to assist both in the countering of waves and in the countering of hammering.

Advantageously, at least one circulation of gases is brought about by gas-displacing forces exerted at locations in a plane which makes an angle of less than 50° with the plane of the ribbon path. Under those circumstances the effect of the circulation of the gases on the suppression of conditions giving rise to the intersecting line defects is very pronounced. In optimum embodiments a circulation of gases is brought about by forces exerted in a plane substantially parallel to the adjacent portion of the ribbon path.

The forces causing circulation of gases may be exerted in directions normal, or substantially normal, to the direction of movement of the ribbon through the drawing chamber, or in directions which are inclined to the direction of such ribbon movement.

In some processes there is a greater tendency for one side of the glass ribbon to become impaired by the intersecting line defects than the other side. Moreover, the quality of sheet glass is improved even if the appearance of such defects is reduced on one side, or face, only of the sheet glass. It is therefore sometimes of substantial benefit to produce the circulation of gases in the drawing chamber on one side only of the ribbon. Nevertheless, in preferred embodiments of the invention at least one circulation of gases is brought about on each side of the ribbon. It is evident that such action on both sides of the ribbon is desirable for producing sheet glass of optimum quality.

The invention includes processes in which at least one circulation of gases is brought about on each side of the glass ribbon, the circulation on one side being in the opposite direction from the circulation on the other side of the ribbon. It has been found that when these conditions are observed the circulation of gases influences the environmental conditions in a way which is particularly effective for inhibiting the formation of the intersecting line defects in the surfaces of the glass.

In certain embodiments, the directions in which the gas-displacing forces are exerted at the opposed sides of the ribbon are inclined to the horizontal. The exertion of the forces at an inclination to the horizontal has been found further to contribute to the required results. In optimum embodiments the forces exerted at the opposed sides of the ribbon are inclined to the horizontal in respectively opposite senses.

It is self-evident that the circulation of gases required by the invention must be brought about without introducing a fresh cause of an adverse heat distribution such as would offset the advantages of producing the gas circulation. It is permissible for the gas circulation to be brought about in a way which involves the supply of heat or cold to the environment of the ribbon provided that such adverse heat distribution is avoided. Nevertheless, in preferred embodiments of the invention the circulation of gases is brought about substantially without altering the rate of cooling of the glass ribbon. The ribbon cooling schedule can then be planned according to existing practice without disturbance by new factors.

It is preferable for there to be at least one closed circuit in the course of which the circulating gases move across substantially the full width of the ribbon. In such cases, the improvement in quality due to the circulation of gases is achieved for substantially the full quantity of drawn glass. The circulation of gases may however be substantially confined to a part or to certain parts only of the width of the ribbon path. In such a case, the improvement in quality may be achieved for only one or more parts of the ribbon width, but this is of practical value, in particular because the ribbon will normally eventually be cut into pieces of glass some of which will derive from the higher quality parts of the ribbon.

A circulation of gases, as required by the invention, can be brought about by exerting gas-displacing forces at at least one pair of successive locations along the ribbon path through the drawing chamber, such locations being in the vicinity of one and the same edge margin of the ribbon. This arrangement promotes a controlled reversal of the direciton of displacement of the gases in the vicinity of such ribbon margin. The displacement forces exerted at such positions must of course act in different directions across the ribbon path.

Preferably gas-displacing forces are exerted at at least one pair of successive locations along the ribbon path through the drawing chamber, one location of such pair being in the vicinity of one margin of the ribbon and the other position of such pair being in the vicinity of the opposite margin of the ribbon. The exertion of forces at such locations is recommended in order to circulate gases along a well defined circuit extending over substantially the full width of the ribbon path. In particularly advantageous embodiments of the invention gas-displacing forces are exerted at a pair of successive positions in the drawing chamber in the vicinity of one margin of the ribbon, and cooperating forces are exerted at an opposed pair of positions in the vicinity of the other margin of the ribbon. The circulation path of the gases over the width of the ribbon path is in such circumstances particularly well controlled.

In certain processes according to the invention the forces causing at least one such circulation of gases are exerted continuously. The continuous exertion of the forces is recommended on the grounds of simplicity of control and avoidance or reduction of energy consumption in overcoming inertia.

However, there are definite advantages in a periodic exertion of gas-displacing forces. The circulation of gases under the influence of periodically exerted forces can have a particularly favorable effect on the surface quality of the drawn sheet glass. These forces may, for example, be exerted at a frequency such that a steady state of the gas currents along the ribbon does not become established or does not become established for a sufficiently long period for the glass to be adversely affected thereby.

If there are periods of force exertion alternating with periods in which no force is exerted, there is less opportunity for a steady dynamic state of the gases in the drawing chamber to become established or approached than if gas-displacing forces are exerted continuously, unless the magnitude of such continuously exerted forces fluctuates with time, as it may do. If there is a fluctuation in the magnitude of the gas-displacing forces then of course it is equally possible to work with continuous forces and at the same time ensure that the environmental conditions are disturbed so that at no time does a steady dynamic condition of the circulating gases become established.

The invention includes processes in which there is at least one gas circuit in which circulation of gases is brought about by gas-displacing forces acting in directions which are periodically reversed thereby to cause periodic reversal of the direction of such gas circulation. Tests have shown that by causing a periodically reversed circulation of gases, the required effect on the environmental conditions in the drawing chamber can be achieved very easily without presenting too much difficulty in the selection of the force magnitudes. When causing a periodically reversed circulation of gases it is of advantage for the exertion of forces causing circulation of gases in one direction to be timed immediately to follow or to coincide with the relaxation of forces causing circulation of gases in the other direction. In such circumstances the gases in the drawing chamber are at all times subjected to displacement forces and the advantage of periodically reversing the circulation can be achieved without creating energetic turbulent currents, with consequent risk of unfavorable side effects on the ribbon surfaces due to the collision of gas streams which are being propelled by oppositely directed displacement forces.

Particular importance is attached to processes in which the gas-displacing forces causing circulation of gases along at least one gas circuit are at least in part exerted by blowing gas into the drawing chamber. It is an important advantage of this mode of operation that the forces can be exerted without the need to install moving parts in the drawing chamber. Moreover, the forces can be exerted in a well-defined direction.

By way of example, a circulation of gases can be brought about by exerting forces at at least one pair of successive locations along the ribbon path, the force exerted at one of the locations of a pair being exerted by blowing gas into the environment surrounging the ribbon at that location and the force exerted at the other location of that pair being exerted by suction.

In some embodiments of the invention, gas-displacing forces causing circulation of gases are exerted at least in part by mechanical means located in the drawing chamber. By using such mechanical means all problems associated with changes in the composition of the gaseous environment of the ribbon, due to the introduction of further quantities of gas from outside, are avoided. It is very suitable to exert the gas-displacing forces by one or more propellers.

The invention includes processes in which the annealing shaft is a vertical shaft surmounting the drawing chamber, and processes wherein the annealing shaft is a horizontal shaft and there is a bending roller about which the ribbon of glass bends preparatory to entering such annealing shaft.

The invention can be applied in glass drawing processes in which the molten glass flows into the ribbon from the full depth of a quantity of molten glass in a channel into which molten glass is continuously fed; in processes in which the molten glass flows into the ribbon from the upper levels of a mass of molten glass in such a feed channel; and in processes in which the ribbon glass is drawn from molten glass floating on a mass of material of higher specific gravity.

The invention includes apparatus for use in manufacturing sheet glass, including a drawing chamber and a contiguous annealing shaft, means for drawing glass as a continuous ribbon into such drawing chamber from the surface of a supply of molten glass at a drawing zone and conducting the ribbon along a path extending through such drawing chamber and annealing shaft, and means for exerting gas-displacing forces in the drawing chamber in directions across the ribbon path, at locations such as to cause gases in the free atmosphere within the chamber to repeatedly traverse, on at least one side of the ribbon path, at least one closed circuit which extends through a region opposite at least one of the two outer thirds of the ribbon width.

Such apparatus has the important advantage that it enables sheet glass to be manufactured which is substantially or completely free of the above described defects in the form of intersecting series of diagonal and vertical lines which have hitherto tended to appear in drawn sheet glass, particularly in the marginal regions of the drawn ribbon.

Various advantageous apparatus features can be incorporated in apparatus according to the invention. These features are self-evidently for the purpose of effecting process features which have already been described. The advantages of these further apparatus features will be understood from what has already been stated about the corresponding process features.

In certain forms of apparatus according to the invention there is at least one cooler located in the lower part of the drawing chamber, and the means for exerting gas-displacing force in a direction across the ribbon path act at at least one location in the immediate vicinity of a cooler to cause or assist such circulation of gases.

The invention can be employed in apparatus in which there is at least one main cooler in the lower part of the drawing chamber and at least one secondary cooler located at a higher level in the drawing chamber, wherein the means for exerting gas-displacing force in a direction across the ribbon path act at at least one location in the immediate vicinity of a secondary cooler, to cause or assist such a circulation of gases.

In preferred apparatus according to the invention, wherein there is at least one main cooler in the lower part of the drawing chamber and at least one secondary cooler located at a higher level in the drawing chamber, means for exerting a gas-displacing force in a direction across the ribbon path are at the general level of a main cooler, and means for exerting a cooperating gas-displacing force in the reverse direction across the ribbon path are at the general level of a secondary cooler, to cause such circulation of gases.

Preferably there is means for exerting gas-displacing forces at locations and in directions such as to cause a circulation of gases, such locations being in a plane which forms an angle of less than 50° with the plane of the adjacent portion of the ribbon path.

In certain embodiments of apparatus according to the invention means are provided for exerting gas-displacing forces to cause a circulation of gases on each side of the ribbon path through the drawing chamber.

If means is provided for exerting gas-displacing forces to cause circulation of gases on each side of the ribbon path, the means is advantageously arranged so that such forces cause a circulation of gases on one side of the ribbon in the opposite direction from the circulation on the other side of the ribbon. Preferably the force exerting means is arranged to exert such forces in directions which are inclined to the horizontal.

The invention includes apparatus in which, for causing at least one such circulation of gases, there is means for exerting gas-displacing forces at at least one pair of successive locations along the ribbon path through the drawing chamber, one location of such pair being in the vicinity of one margin of such path and the other location of such pair being in the vicinity of the opposite margin of such path.

In certain forms of apparatus according to the invention, means are provided for exerting gas-displacing forces at a pair of successive locations along the ribbon path through the drawing chamber, in the vicinity of one margin of such path, and for exerting cooperating forces at an opposed pair of locations in the vicinity of the other margin of such path, to cause such a circulation of gases.

Advantageously, means are provided for causing periodic reversal of the directions of exertion of the gas-displacing forces causing circulation of gases along at least one gas circuit.

In certain optimum forms of apparatus according to the invention, which are provided with means for causing a periodic reversal of the directions of the gas-displacing forces, there is also provided force exertion control means which causes the direction of exertion of the gas-displacing forces along at least one gas circuit to be periodically reversed according to a program such that the exertion of forces causing circulation of gases in one direction immediately follows or coincides with the relaxation of forces causing circulation in the other direction.

In particularly advantageous embodiments of the invention, means is provided for blowing gases into the drawing chamber at one or more locations in order to exert, at that location or locations, gas-displacing forces to cause or assist at least one such circulation of gases.

Advantageously, the means for exerting gas-displacing forces at one or more locations in the drawing chamber by blowing gas into such chamber includes one or more gas ejector devices located at such location or locations. The use of ejectors is recommended, inter alia, because of the large volume rate of displacement of gases which can be induced by injecting a relatively small quantity of gas and without using a high injection pressure, these advantages being due to the action of the diffuser.

The invention includes apparatus in which mechanical means, e.g., a propeller, is provided at one or more locations in the drawing chamber in order to exert thereat gas-displacing forces to cause or assist at least one such circulation of gases.

The annealing shaft of the apparatus may be a vertical annealing shaft surmounting the drawing chamber. Alternatively the apparatus may incorporate a horizontal annealing shaft and a bending roller about which the ribbon of glass bends preparatory to entering such annealing shaft.

DESCRIPTION OF THE PREFERRED EMBODIMENTS

The examples of the invention which are to be described with reference to the drawings serve only to illustrate some of the numerous ways in which the invention can be performed, and they are in no way limitative.

Figure 1:
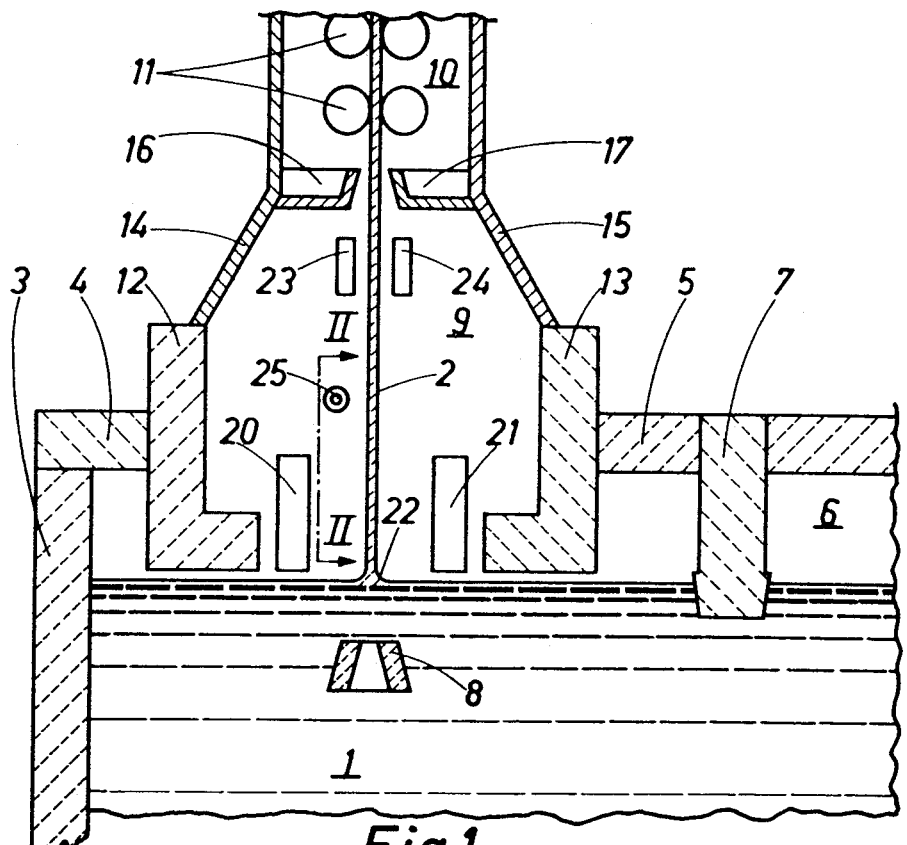
FIG. 1 is a cross-sectional elevation of part of a Pittsburgh type glass drawing machine which has been equipped in accordance with the invention with means for circulating gases within the drawing chamber.
Figure 2:
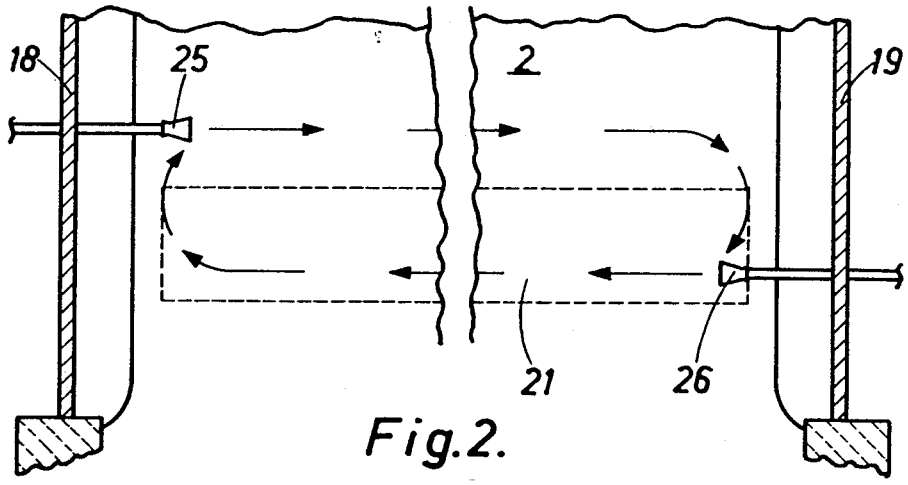
FIG. 2 is a cross section of part of this same machine, taken along the line II—II of FIG. 1.

In the Pittsburgh-type glass drawing machine illustrated in FIGS. 1 and 2, a continuous supply of molten glass forms a bath 1 from the surface of which glass is drawn vertically upwardly as a continuous ribbon 2. The bath of molten glass is held in a kiln formed in part by a terminal end wall 3 and roof portions 4 and 5.

The molten glass is supplied to the kiln from a glass melting furnace (not shown). The region 6 of the atmosphere above the bath of molten glass, which region communicates with the interior of the glass melting furnace, is isolated from the atmosphere in contact with the molten glass at the drawing zone by a shut-off 7 which extends transversely of the kiln and dips into the molten glass.

The location of the source 22 of the ribbon at the surface of the molten glass bath is stabilized by a draw-bar 8 which is immersed in the molten glass bath at the drawing zone. The drawn glass ribbon is entrained upwardly through a drawing chamber 9 and through a contiguous vertical annealing shaft, or lehr, 10 by rollers 11 mounted in this shaft.

The drawing chamber is formed in part by rear and front L-blocks 12 and 13 and by upper wall portions 14 and 15 which connect such L-blocks to the bottom of the annealing shaft. The drawing chamber is partly closed at the top by catch pans 16 and 17 which are spaced to leave a slot via which the glass ribbon passes from the drawing chamber into the annealing shaft. The sides of the drawing chamber are formed by walls 18 and 19 (FIG. 2) which are normally heated.

In order to accelerate the dimensional setting of the ribbon of drawn glass, main coolers 20 and 21 are provided on opposite sides of the ribbon path, close to the meniscus 22, and the cooling of the ribbon is further promoted by secondary coolers 23 and 24. A cooling fluid, usually water, is circulated through the main and secondary coolers via conduits (not shown).

Hot currents of gas ascend within the drawing chamber along the two faces of the glass ribbon 2, the gas being heated by the intense heat radiated from the molten glass bath and the ribbon itself. These hot gas currents include gas which is drawn along the surface of the molten glass bath, under the L-blocks, from the regions immediately adjacent the drawing chamber, i.e., the region between the rear L-block 12 and the terminal end wall 3, and the region between the front L-block 13 and the shut-off 7. The hot gases are drawn upwardly through the drawing chamber by the strong natural draft forces which are due to the chimney effect produced by the vertical annealing shaft 10.

These ascending currents of hot gas flow along the main central portion of the ribbon path. Cooler currents of gas flow downwardly from the annealing shaft and along the walls of the drawing chamber and tend to keep the marginal portions of the ribbon at a lower temperature. The heat distribution within the drawing chamber is further affected by the behavior of the currents of cooled gases which descend from the main and auxiliary coolers. The currents of gas which descend along the walls of the drawing chamber become reheated as they move nearer to the bath of molten glass and consequently change direction and flow inwardly towards the ribbon and join the main upward currents of hot gas. As a result of the non-uniform heat distribution across the ribbon path, surface defects of the type described earlier appear in the drawn glass. Among the type of surface defects which tend to appear in sheet glass drawn in the illustrated apparatus, is the type of defect which appears as intersecting series of diagonal and vertical lines. It has been found that there is a greater tendency for the rear face, i.e., the face directed toward cooler 20, of the drawn glass ribbon to be marred by this type of defect than the front face.

In the embodiment of the invention illustrated in FIGS. 1 and 2, the occurrence of these intersecting line defects on the rear face of the ribbon of glass is prevented or reduced by bringing about a circulation of gases within the drawing chamber. Within the drawing chamber, at the rear face of the ribbon path, a pair of ejectors 25 and 26 is provided for this purpose.

The ejector 25 is located opposite one marginal edge portion of the ribbon path, at a level just above the top of the main coolers 20 and 21, and points in a direction transversely across the ribbon path, while the other ejector 26 is located opposite the other marginal edge portion of the ribbon path, at a level just above the bottom of the main coolers, and points transversely across the ribbon path, in the opposite direction to ejector 25.

Hot gas is simultaneously forced into the drawing chamber through these ejectors 25 and 26. The injected gas is pre-heated, for example by means of heat-exchangers located in the drawing chamber, and is distributed to the ejectors by appropriate means (not shown). The continuous discharge of hot gas through the ejectors causes a continuous circulation of gases to occur as suggested by the arrows in FIG. 2. It will be seen that the gases follow a substantially oval circuit in which they sweep along curved paths over the marginal portions of the ribbon, and it is thought that this action of the gases is responsible for the beneficial effect of the gas circulation in countering the formation of intersecting line defects.

Tests with the process represented in FIGS. 1 and 2 show that the circulation of gases as described in the immediate vicinity of a main cooler also tends to reduce wave formation in the drawn glass. However, the invention is not primarily intended to deal with surface defects other than those of the aforesaid intersecting line type. Other types of defect, e.g., waves, can be avoided or reduced by other measures, known per se. However it is of interest to observe that the measure required by the present invention can in certain cases, as a secondary effect, make its own contribution to the elimination of other kinds of defects.

In a first modification of the process and apparatus described with reference to FIGS. 1 and 2, ejectors such as 25 and 26 are used but disposed in a vertical plane through the main cooler 20 and at levels respectively slightly above and slightly below the secondary cooler 23 so as to cause circulation of gases in a substantially oval circuit adjacent the outside face of such secondary cooler. In this modification, the operation of the ejectors serves substantially to obviate the occurrence of intersecting line defects in the drawn sheet glass and also, as a secondary effect, to reduce hammering.

In a second modification, the pair of ejectors 25 and 26 is used, in the positions shown in FIGS. 1 and 2, and a further pair of ejectors is located at the general level of the secondary cooler 23 in the same arrangement as the ejectors of the above described first modification. In this second modification, the operations of the two pairs of ejectors serve substantially to prevent intersecting line defects in the drawn sheet glass and, as a secondary effect, to reduce the occurrence of both waves and hammering.

Figure 3:
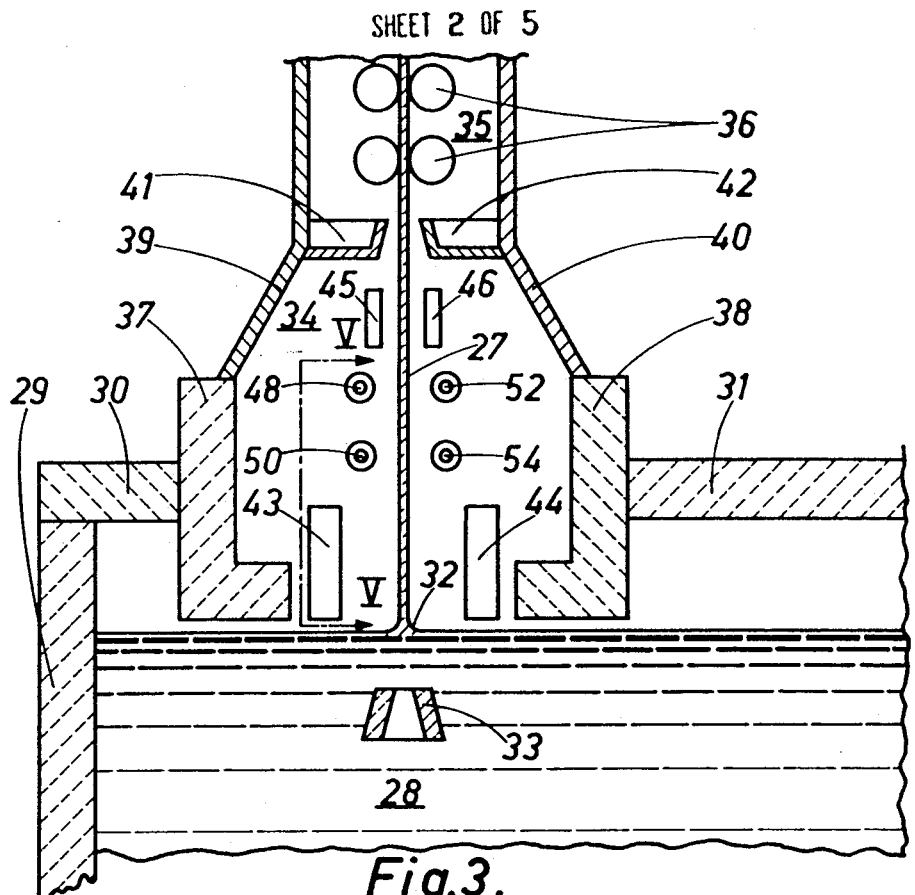
FIG. 3 is a cross-sectional elevation of part of another Pittsburgh-type glass drawing machine according to the invention.
Figure 4:
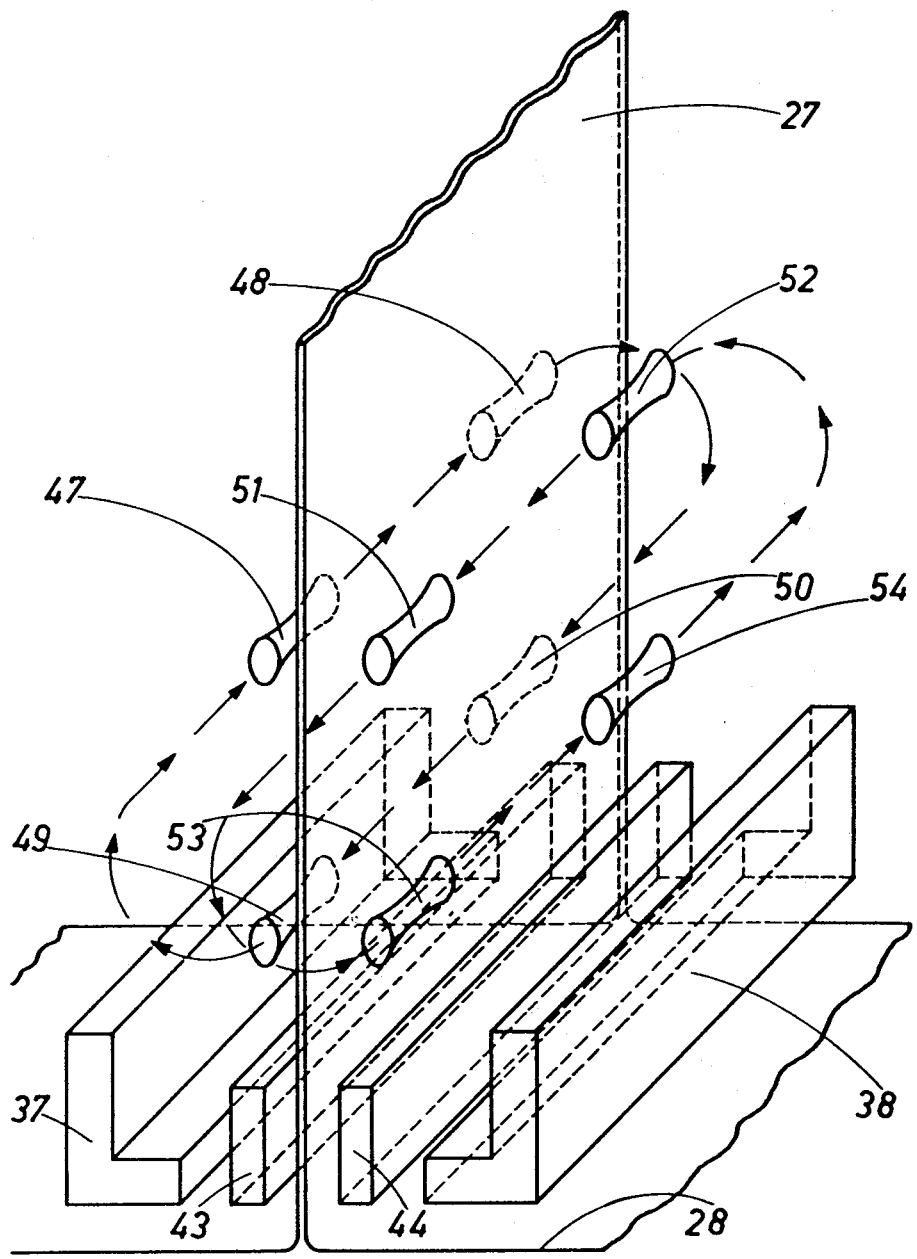
FIG. 4 is a perspective view of part of the drawing chamber of the machine of FIG. 3.

In the apparatus shown in FIGS. 3 and 4 a ribbon of glass 27 is drawn from a bath 28 of molten glass held in a kiln, only the terminal end wall 29 and roof portions 30 and 31 of which are shown.

The location of the source of the drawn ribbon, where a meniscus 32 is formed, is stabilized by a drawbar 33 submerged in the molten glass bath 28. The glass ribbon 27 is drawn upwardly, through a drawing chamber 34 and an annealing shaft 35, by a succession of pairs of rollers 36 mounted in such annealing shaft.

The drawing chamber 34 is formed in part by L-blocks 37 and 38 which are immediately above the surface of the molten glass bath, and in part by upper wall portions 39 and 40 which extend between the tops of the L-blocks and the bottom of the annealing shaft. At the top of the drawing chamber there are catch pans 41 and 42 which constitute the bottom of the annealing shaft and are spaced apart to provide a slot via which the ribbon enters such shaft.

Main coolers 43 and 44 and secondary coolers 45 and 46 are provided in the drawing chamber, the function of these coolers being the same as the main and secondary coolers in the machine described with reference to FIGS. 1 and 2.

In the present embodiment of the invention, the occurrence of intersecting line defects is avoided or reduced by causing a circulation of gases within the drawing chamber on each side of the ribbon path. This circulation is brought about by forcing hot gas into the drawing chamber through pairs of ejectors. On one side of the ribbon there is a pair of ejectors 47 and 48 which are located in the drawing chamber at the general level of the secondary coolers 45 and 46 and which are opposite zones located centrally of the outer thirds of the ribbon width, and a pair of ejectors 49 and 50 which are located directly beneath ejectors 47 and 48, respectively, and which are at the general level of the main coolers 43 and 44. Ejector 47 points across the ribbon path, normal to the direction of movement of the ribbon. Ejector 48 points in the same directions as ejector 47 and therefore operates to draw gas across the ribbon path, thereby cooperating with ejector 47. Ejector 50 points across the ribbon path and ejector 49 points in the same direction as and cooperates with ejector 50. The four ejectors are operated simultaneously and in consequence cause a continuous circulation of gas, substantially in a plane parallel to the ribbon, in a substantially oval circuit along which the four ejectors are located.

On the other side of the ribbon there are two pairs of ejectors 51, 52 and 53, 54. These ejectors function in a similar way to the ejectors 47–50 so that a continuous circulation of gas is also brought about on the side of the ribbon at which such ejectors 51–54 are located, but the direction of such gas circulation is opposite to that of the gas circulation on the other side of the ribbon.

The ejectors are of the Giffard or Venturi type in which an injector tube, through which gas is injected into the drawing chamber, intrudes into a surrounding sleeve or diffuser. The use of ejectors of that type affords important advantages, in particular an economy in the consumption of gas under pressure, an economy of heat, the entrained gases attaining a higher temperature, and entrainment of a large quantity of environmental gases, and a volume rate of gas displacement which is appreciably in excess of the volume rate of delivery of gas through the injection tube. As the volume rate of supply of the injected gas is relatively low, this gas does not have to be preheated to a high temperature.

Figure 5:
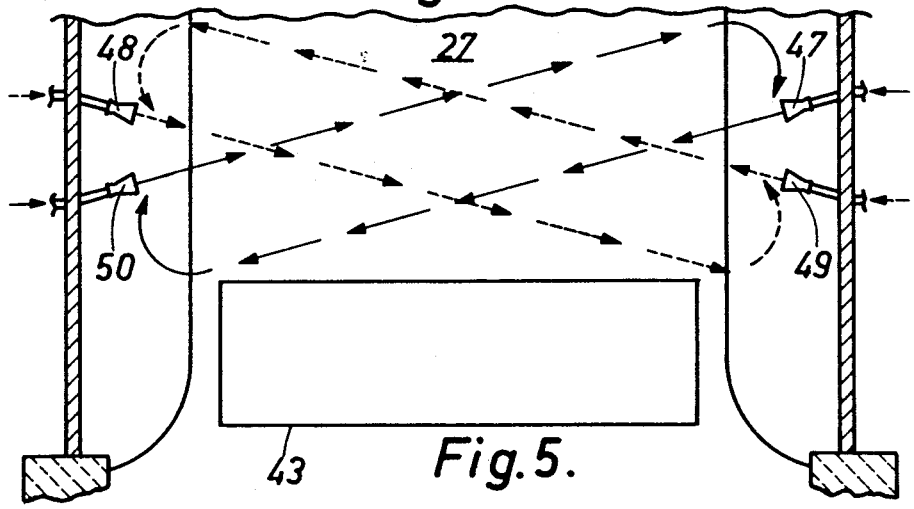
FIG. 5 is a cross-sectional elevation of a modification of the machine of FIG. 3, the section being on line V—V of FIG. 3.

In the modification represented in FIG. 5, which as already stated is a cross section of the modification on a line V–V as shown in FIG. 3, there are, on each side of the plane in which the glass ribbon travels through the drawing chamber, four ejectors which are oriented to exert gas-displacing forces at an inclination to the horizontal. The ejectors are operated two at a time in succession, first one pair and then the other pair and so on alternately, to cause a circulation of gases first in one direction and then in the reverse direction.

An actual operating cycle is as follows: In a first period, the ejectors 47 and 50 are operated by injecting hot gas through the injector tubes of these ejectors under a pressure of 250 g/cm$^2$ and at a speed of 10 m/sec. The injected gas is preheated by heat exchangers (not shown) or other means. The operation of the ejectors 47 and 50 causes a circulation of gases within the drawing chamber as represented by the full line arrows. While the ejectors 47 and 50 are operating, ejectors 52 and 53 on the opposite side of the ribbon plane are operated to bring about a circulation of gases in a similarly inclined circuit on the opposite side of the ribbon. The gas circulations on the opposed sides of the ribbon are in respectively opposite directions, i.e. one is a clockwise and the other is a counterclockwise circulation. Moreover, the forces causing the circulation on one side of the ribbon plane are inclined in a different direction to the horizontal from the forces causing the circulation on the other side of such planes. In the second period of the operating cycle, the ejectors 48 and 49, and the ejectors 51 and 54 on the other side of the ribbon plane, are operated, and the ejectors 47, 50 and 52, 53 are idle. Consequently, in this second period the circulation of gases on each side of the ribbon plane is in the reverse direction from the circulation during the first period of the cycle. The direction of circulation of gases caused by the operation of ejectors 48 and 49 in the second period of the cycle is indicated in FIG. 5 by broken line arrows.

In a particular process performed in the manner described with reference to FIG. 5, the ejectors were operated according to a 20 second cycle, each cycle including a 10-second circulation of gases in one direction and a 10-second circulation of gases in the reverse direction, on each side of the ribbon plane. It was found that this circulation of gases improved the environmental conditions within the drawing chamber in such a way that the drawn glass ribbon was substantially free of intersecting line surface defects.

In another process performed with the machine represented by FIG. 5, the two pairs of ejectors on each side of the ribbon plane were operated for unequal periods of time, one pair being operated for 10 seconds and the other pair being operated for 20 seconds, and so alternately, each complete cycle thus being of 30 seconds duration. In this process also, the drawn glass ribbon was found to be substantially free of the aforesaid intersecting line defects.

Figure 6:
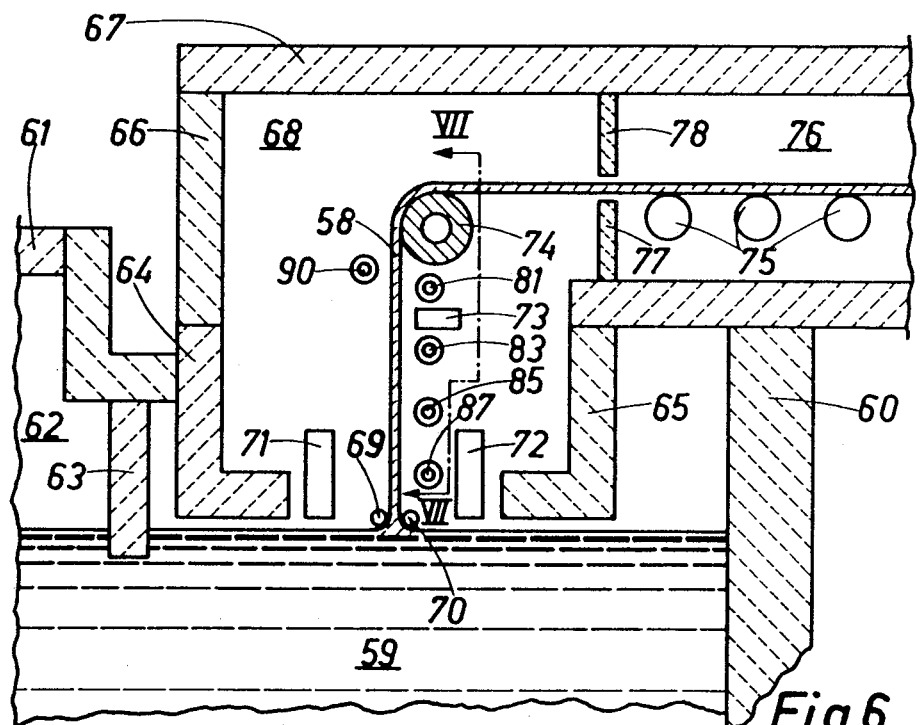
FIG. 6 is a cross-sectional elevation of part of another glass drawing machine equipped with means for circulating gases within the drawing chamber in accordance with the invention.
Figure 7:
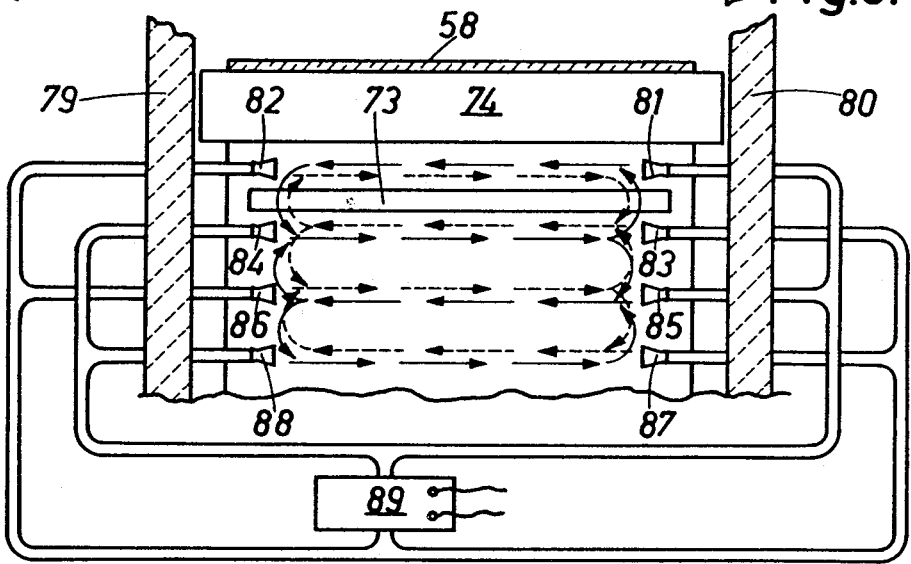
FIG. 7 is a cross-sectional view on line VII—VII of FIG. 6.

FIGS. 6 and 7 illustrate a machine in which a ribbon of glass 58 is drawn from a bath 59 of molten glass. The supply of molten glass for drawing is held in a kiln only the terminal end wall 60 and a roof portion 61 of which are shown. en The atmosphere in the region 62 above the molten glass in the kiln is in communication with a glass-melting furnace (not shown) from which the molten glass is supplied, and this region 62 is isolated from the atmosphere within the drawing machine by a shut-off 63 which extends transversely across the kiln and dips into the molten glass bath. The drawing machine includes L-blocks 64 and 65, an upper wall portion 66 and a cover 67, which components form part of a drawing chamber 68 into which the ribbon of glass 58 is drawn from the surface of the molten glass bath 59.

The margins of the ribbon are gripped by edge rolls 69 and 70 which keep the width of the ribbon constant. The ribbon initially follows a vertical path extending between main coolers 71 and 72 and then past a secondary cooler 73. At a level above this secondary cooler the ribbon travels around a bending roller 74 and the ribbon then continues its movement along a horizontal path, supported on conveying rollers 75, through a horizontal annealing shaft 76. The entrance to the annealing shaft is in the form of a slot defined by a refractory screen 77 and by a sheet or curtain 78 formed, for example, of asbestos. The drawing chamber is closed at the sides by walls 79 and 80 (FIG. 7).

In order to influence the environmental conditions so as to prevent or reduce the formation of intersecting line surface defects in the ribbon, predominantly in the outer portions of its width, a circulation of gases is brought about in the drawing chamber in accordance with the invention by the action of pairs of ejectors 81–82, 83–84, 85–86 and 87–88 located at different levels beneath the bending roller. The ejectors are operated by forcing preheated gas through the injection tubes of the ejectors. The means whereby the injected gas is preheated is not shown. This means can be any preheating means known per se, e.g., heat-exchangers which can be located in the drawing chamber. The ejectors are supplied with the preheated gas via an electrically controlled distributor 89 which connects the source of the preheated gas to the ejectors according to a predetermined cycle as follows.

In a first period, the ejectors 81, 84, 85 and 88 are operated. The forces exerted in the drawing chamber by the simultaneous discharge of gas through these ejectors causes gases within the drawing chamber to be displaced in three closed circuits as represented in FIG. 7 by the full line arrows.

In a second period the ejectors 82, 83, 86 and 87 are operated and the ejectors 81, 84, 85 and 88 are idle.

The forces exerted in the drawing chamber during this second period cause gases in the drawing chamber to be displaced in the same three circuits but in the reverse directions, as indicated by the broken line arrows. These ejectors then become idle and the other ejectors are operated, and so on alternately.

The periodically reversed circulation of gases as described has a beneficial effect in inhibiting the occurrence of intersecting line surface defects in the drawn glass.

In a particular process performed as described with reference to FIGS. 6 and 7, the ejectors were supplied with gas under a pressure of 200 g/cm$^2$ and at a speed of 10 m/sec. The distributor 89 was set to cause operation of each set of four ejectors for 10 seconds with intervals, i.e., "dead times", of 5 seconds between the successive ejector operations.

On the side of the ribbon path opposite to that at which the eight ejectors operate, two further ejectors are provided. Only one of these ejectors, designated 90, appears in FIG. 6. This ejector 90 is located at a level just below the bending roller 74, opposite one margin of the ribbon path, and points across such path. The other one of the further ejectors is adjacent the opposite margin of the ribbon path and between the ribbon path and the main cooler 71. These two further ejectors are operated continuously so as to cause a continuous circulation of gases within the drawing chamber on the side of the ribbon path at which the main cooler 71 is located. The gases traverse a closed oval circuit substantially as depicted by the arrows in FIG. 2. This continuous circulation of gases by the action of the further ejectors improves the quality of the corresponding surface of the glass ribbon by inhibiting the formation of intersecting line defects in that surface. It has been found that by causing circulations of gases by means of ejectors situated as shown in FIGS. 6 and 7, the circulations serve the secondary purpose of reducing the occurrence of waves and hammering in the surfaces of the drawn sheet glass.

Figure 8:
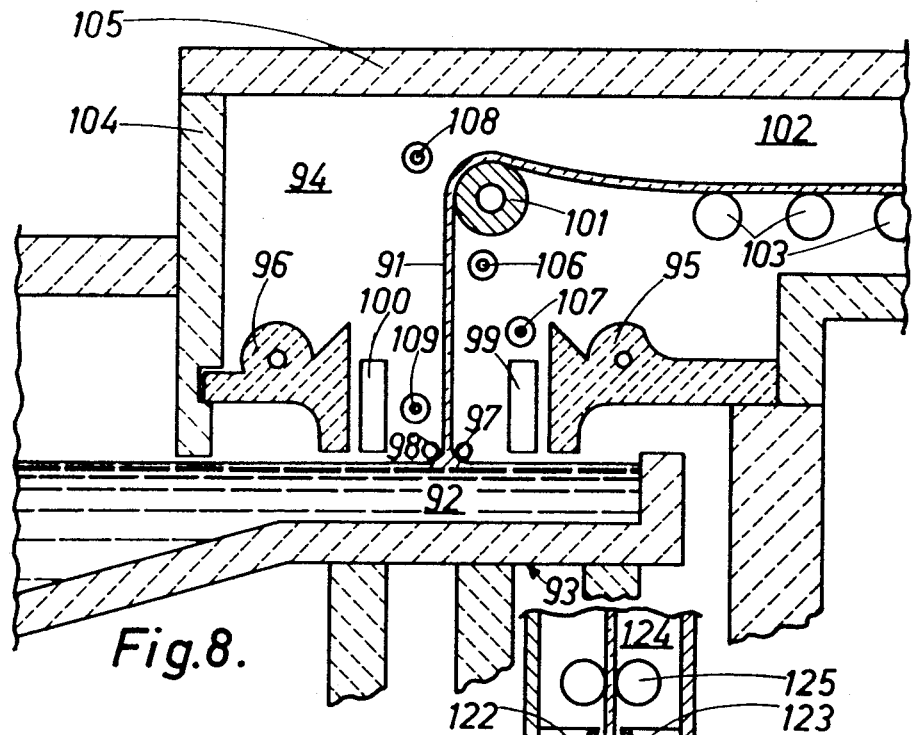
FIG. 8 is a cross-sectional elevation of part of a classic Libbey-Owens type glass drawing machine which has been provided with means according to the invention for circulating gases within the drawing chamber.

FIG. 8 shows part of a classic Libbey-Owens type glass drawing machine, which however has been modified to enable the machine to perform a glass drawing process according to the invention.

In this process, a ribbon of glass 91 is drawn from the surface of a bath 92 of molten glass held in a kiln 93. The ribbon is drawn upwardly into a drawing chamber 94 at the bottom of which there are conventional lip-tiles 95 and 96. Edge rolls 97 and 98 grip the edges of the ribbon and maintain it at a constant width. Between the lip-tiles and the ribbon path there are main coolers 99 and 100. After passing upwardly between these main coolers, the ribbon becomes bent around a bending roller 101 and then advances along a horizontal annealing shaft 102 while supported on conveying rollers 103. The drawing chamber is defined at the front by a refractory wall 104 which extends upwardly to a roof wall 105 which covers the top of the drawing chamber and the annealing shaft.

In order to inhibit the occurrence within the drawing chamber of thermal conditions causing the formation of intersecting line defects in the outer portions of the ribbon width, a circulation of gases is brought about at the rear side of the ribbon by blowing gas into the drawing chamber through a pair of ejectors 106 and a pair of ejectors 107. The ejectors of each pair are on a common transverse axis and point in opposite directions across the ribbon path. Only one ejector of each pair appears in the drawing because the ejectors of each pair are disposed opposite different margins of the ribbon. The ejectors are operated two at a time alternately.

In one period of the operating cycle the ejector 106 opposite one margin of the ribbon path and the ejector 107 which is opposite the other margin of the ribbon path are simultaneously operated, and in the next period of the cycle these ejectors are idle and the other two ejectors are simultaneously operated. Consequently a circulation of gases is brought about first in one direction and then in the opposite direction, in each cycle. It will be noted that the axes of the pairs of ejectors 106 and 107 are disposed in a plane which is at an inclination to the plane of the adjacent portion of the glass ribbon.

At the other side of the ribbon path through the drawing chamber there are two pairs of ejectors 108 and 109 in a plane parallel with the ribbon path and passing between the ribbon and the main cooler 100. The ejectors at this side of the ribbon are operated two at a time alternately to cause circulation of gases first in one direction and then in the opposite direction, in the same manner as the ejectors 106 and 107.

The control of the ejectors in the machine represented in FIG. 8 is achieved by an electrically controlled distributor like the distributor 89 of FIG. 7.

Figure 9:
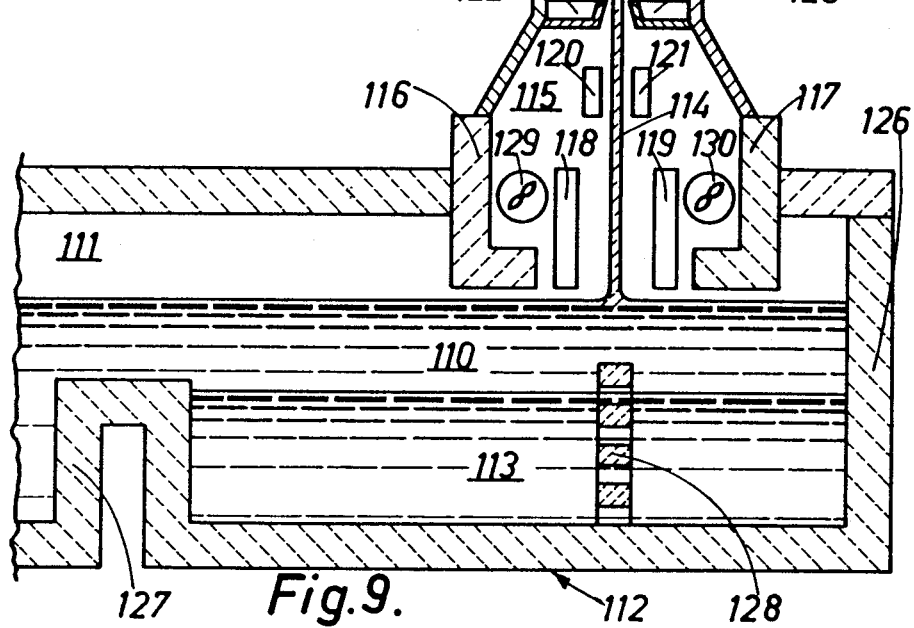
FIG. 9 is a cross-sectional elevation of part of another glass drawing machine according to the invention.

In the machine shown in FIG. 9, a supply of molten glass 110 flows from a glass-melting furnace 111 into a kiln 112 holding a quantity of molten material 113 of a higher specific gravity than the molten glass, so that the glass floats on the material. A ribbon of glass 114 is drawn from the surface of this floating molten glass, into a drawing chamber 115 which is formed in part by the usual L-blocks 116 and 117 and which contains two main coolers 118 and 119 and two secondary coolers 120 and 121. The ribbon of glass is drawn upwardly between catch pans 122 and 123 at the bottom of a vertical annealing shaft 124, and along this shaft, by a succession of pairs of rollers 125.

The kiln from which the molten glass is drawn is composed of a terminal end wall 126 and a front transverse sill wall 127, and the quantity of higher specific gravity material 113 is confined by these walls and the side walls of the kiln.

Within the mass of molten material in the kiln 112 there is a transverse wall 128 which extends upwardly from the bottom of the kiln at a position immediately below the drawing zone. This submerged wall 128 serves to stablize the location of the meniscus at the surface of the molten glass. The wall 128 has openings therein allowing free flow of molten material from one side of the wall to the other.

In order to inhibit the formation of intersecting line defects in the surface of the glass ribbon, a circulation of gases is brought about within the drawing chamber, on each side of the ribbon. The circulation of one side of the ribbon is caused by a pair of propellers 129 while the circulation on the other side of the ribbon is caused by a pair of propellers 130. Only one propeller of each pair appears in the drawing because viewed in a direction normal to the plane of the drawing the propellers are disposed relatively to each other and to the margins of the ribbon in a manner similar to that for the ejectors 25 and 26 of FIG. 2. The propellers which do not appear in the drawing are located at a higher level than the propellers shown.

In one embodiment of the process which was performed with very satisfactory results the upper propellers were located in the general vertical planes of the main coolers 118 and 119 so that the general plane of each gas circuit was inclined to the ribbon plane. The propellers were operated continuously.

In a modification of the embodiment described with reference to FIG. 9, the axes of the pairs of propellers 129 and 130 were inclined to the horizontal so as to bring about displacement of gases in a closed oval circuit on each side of the ribbon, the major axis of the circuit being inclined to the horizontal similar to that for the gas circuits represented in FIG. 5.

In all of the embodiments described with reference to the accompanying drawings, the circuits along which the gases are circulated extends across substantially the full width of the ribbon path. It is within the scope of the invention for gases to be displaced in a closed circuit which extends over only a part of the ribbon path, provided that the circuit extends through at least one region which is opposite an outer third of the ribbon width so that the circulating gases influence the environmental conditions where they are otherwise liable to give rise to the described intersecting line surface defects in the drawn glass. In an actual embodiment of the invention (not illustrated), a machine as described with reference to FIGS. 1 and 2 was used but the ejector 25 was placed substantially opposite the longitudinal center line of the ribbon. In consequence the operation of the ejectors caused gases to follow a closed circuit opposite one half of the ribbon width. It was found that the rear face of the drawn sheet glass was substantially free of intersecting line surface defects in what, in the plane of the view of FIG. 2, is the right-hand half of the ribbon width. However the other half of the ribbon width was marred by some intersecting line defects which were predominantly in the corresponding outer third of the ribbon width.

It will be understood that the above description of the present invention is susceptible to various modifications, changes and adaptations, and the same are intended to be comprehended within the meaning and range of equivalents of the appended claims.

I claim:

1. A process of manufacturing sheet glass comprising the steps of: supplying molten glass to a drawing zone; drawing glass as a continuous ribbon from the surface of the supply of molten glass at said zone, through a drawing chamber and a contiguous annealing shaft; and displacing gases in the drawing chamber across the ribbon path, and along at least one closed circuit which extends through a region opposite at least one of the two outer thirds of the ribbon width within the drawing chamber and on one side of the ribbon, said gases having a vertical component along at least a portion of said circuit.

2. A process according to claim 1, wherein the ribbon of glass is drawn past at least one cooler located in the lower portion of the drawing chamber, and at least some of the gas is displaced in a direction across the ribbon path and at the general level of the cooler.

3. A process according to claim 1 wherein the ribbon is drawn past at least one cooler located in the lower portion of the drawing chamber and past at least one secondary cooler located at a higher level in the drawing chamber, and at least some of the gas is displaced in a direction across the ribbon path and at the general level of the secondary cooler.

4. A process according to claim 1 wherein the ribbon is drawn past at least one main cooler located in the lower portion of the drawing chamber and past at least one secondary cooler located at a higher level in the drawing chamber, and at least some of the gas is displaced in a direction across the ribbon path and at the general level of the main cooler and at least some of the gas is displaced in the reverse direction across the ribbon path and at the general level of the secondary cooler.

5. A process according to claim 1 wherein at least some of the gas is displaced at locations in a plane which forms an angle of less than 50° with the plane of the adjacent portion of the ribbon path.

6. A process according to claim 1 wherein said step of displacing is carried out for producing a circulation of gases in the drawing chamber on each side of the glass ribbon.

7. A process according to claim 6 wherein the circulation on one side of the ribbon is in the opposite direction from the circulation on the other side of the ribbon.

8. A process according to claim 7 wherein the displacing of gases which produce the circulations in opposite directions on the opposed sides of the ribbon are in directions which are inclined to the horizontal.

9. A process according to claim 1 wherein the displacing of gases is carried out at at least one pair of successive locations along the ribbon path through the drawing chamber, one location of such pair being in the vicinity of one edge margin of the ribbon and the other location of such pair being in the vicinity of the opposite edge margin of the ribbon.

10. A process according to claim 1 wherein the displacing of gases is carried out at a pair of successive locations in the drawing chamber, in the vicinity of one edge margin of the ribbon, and cooperating displacing of gases is carried out at an opposed pair of locations in the vicinity of the other edge margin of the ribbon.

11. A process according to claim 1 wherein the displacement of gases along at least one closed circuit is continuous.

12. A process according to claim 1 wherein the displacement of gases along at least one closed circuit is periodic.

13. A process according to claim 1 wherein the displacement of gases along at least one closed circuit is periodically reversed thereby to cause periodic reversal of the direction of gas flow along such circuit.

14. A process according to claim 13 wherein the displacing of gases in one direction is timed to commence not before the cessation of flow of gases in the other direction.

15. A process according to claim 1 wherein the displacing of gas is at least in part produced by blowing gas into the drawing chamber.

16. A process according to claim 1 wherein the gas-displacing forces are at least in part produced by mechanical means located in the drawing chamber.

17. A process according to claim 1 wherein the annealing shaft is a vertical shaft surmounting the drawing chamber.

18. A process according to claim 1, wherein the annealing shaft is a horizontal shaft and there is a bending roller about which the ribbon of glass bends preparatory to entering such annealing shaft.

19. A process according to claim 1 wherein the molten glass flows into the ribbon from the full depth of a quantity of molten glass in a channel into which molten glass is continuously fed.

20. A process according to claim 1 wherein the molten glass flows into the ribbon from the upper levels of a mass of molten glass in a channel into which molten glass is continously fed.

21. A process according to claim 1 wherein the ribbon of glass is drawn from molten glass floating on a mass of material of higher specific gravity.

22. Apparatus for use in manufacturing sheet glass, comprising, in combination: a drawing chamber; an annealing lehr contiguous with said drawing chamber; means for drawing a continuous ribbon of glass into said drawing chamber from a drawing zone which is fed with molten glass and for conducting the ribbon along a path extending through said drawing chamber and annealing lehr; and means for displacing gases across the ribbon in said drawing chamber and along at least one circuit which extends through a region opposite at least one of the two outer thirds of the ribbon width within the drawing chamber and on one side of the ribbon, said means being arranged to provide a vertical component to the displaced gas along at least a portion of said circuit.

23. Apparatus according to claim 22 further comprising at least one cooler located in the lower part of said drawing chamber, and wherein said means for displacing exert gas-displacing forces in a direction across the ribbon path at at least one location in the immediate vicinity of said cooler to cause such movement of gases.

24. Apparatus according to claim 22 further comprising at least one main cooler in the lower part of said drawing chamber and at least one secondary cooler located at a higher level in said drawing chamber, and wherein said means for displacing exert gas-displacing forces in a direction across the ribbon path, at at least one location in the immediate vicinity of said secondary cooler, to cause such movement of gases.

25. Apparatus according to claim 22 further comprising at least one main cooler in the lower part of said drawing chamber, and at least one secondary cooler located at a higher level in said drawing chamber, and wherein said means for displacing exert gas-displacing forces in a direction across the ribbon path, at the general level of said main cooler and exert cooperating gas-displacing forces in the reverse direction across the ribbon path and at the general level of said secondary cooler, to cause such movement of gases.

26. Apparatus according to claim 22 wherein said means for displacing exert gas-displacing forces at locations lying in a plane which forms an angle of less than 50° with the plane of the adjacent portion of the ribbon path.

27. Apparatus according to claim 22 wherein said means for displacing exert gas-displacing forces to cause such movement of gases on each side of the ribbon path through said drawing chamber.

28. Apparatus according to claim 27 wherein the directions of such forces are such that the movement of gases on one side of the ribbon is in the opposite direction from the movement on the other side of the ribbon.

29. Apparatus according to claim 28 wherein said means for displacing exert such forces in directions which are inclined to the horizontal.

30. Apparatus according to claim 22 wherein said means for displacing exert gas-displacing forces at at least one pair of successive locations along the ribbon path through said drawing chamber, one location of such pair being in the vicinity of one margin of such path and the other location of such pair being in the vicinity of the opposite margin of such path.

31. Apparatus according to claim 22 wherein said means for displacing exert gas-displacing forces at a pair of successive locations along the ribbon path through said drawing chamber, in the vicinity of one margin of such path, and exert cooperating forces at an opposed pair of locations in the vicinity of the other margin of such path.

32. Apparatus according to claim 22 further comprising control means for causing periodic reversal of the directions of the gas displacement causing circulation of gases along at least one such circuit.

33. Apparatus according to claim 32 wherein said control means causes the directions of the gas displacement in at least one such gas circuit to be periodically reversed according to a program such that the displacement of gases in one direction occurs not before the cessation of displacement in the other direction.

34. Apparatus according to claim 22 wherein said means for displacing comprises means for blowing gases into said drawing chamber at at least one location for exerting thereat gas-displacing forces to cause at least one such movement of gases.

35. Apparatus according to claim 34 wherein said means for blowing comprises at least one gas ejector device located at such location.

36. Apparatus according to claim 22 wherein said means for displacing comprise mechanical means disposed at at least one location in said drawing chamber in order to exert thereat gas-displacing forces to cause at least one such movement of gases.

37. Apparatus as claimed in claim 36 wherein said mechanical means comprise at least one propeller.

38. Apparatus according to claim 22 wherein said annealing lehr is a vertical lehr surmounting said drawing chamber.

39. Apparatus according to claim 22 wherein said annealing lehr is a horizontal lehr and further comprising a bending roller about which the ribbon of glass bends preparatory to entering said annealing lehr.

40. Apparatus according to claim 22 further comprising a channel along which molten glass feeds to the drawing zone, and which holds a quantity of molten glass such than molten glass flows into the ribbon of glass from the full depth of the molten glass in said channel.

41. Apparatus according to claim 22 further comprising a channel along which molten glass feeds to the drawing zone and which holds a quantity of molten glass such that molten glass flows into the ribbon from the upper levels of the molten glass in said channel.

42. Apparatus according to claim 22 further comprising a channel along which molten glass feeds to the drawing zone while floating on a mass of material of higher specific gravity.

* * * * *